United States Patent
Terazaki et al.

(10) Patent No.: US 10,575,340 B2
(45) Date of Patent: Feb. 25, 2020

(54) RADIO COMMUNICATION APPARATUS AND RADIO COMMUNICATION METHOD

(71) Applicant: CASIO COMPUTER CO., LTD., Shibuya-ku, Tokyo (JP)

(72) Inventors: Tsutomu Terazaki, Saitama (JP); Toshihiro Takahashi, Kunitachi (JP); Ryo Okumura, Fussa (JP); Takahiro Tomida, Hamura (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 16/101,112

(22) Filed: Aug. 10, 2018

(65) Prior Publication Data
US 2018/0349959 A1 Dec. 6, 2018

Related U.S. Application Data

(62) Division of application No. 15/321,696, filed as application No. PCT/JP2015/066304 on Jun. 5, 2015.

(30) Foreign Application Priority Data

Jun. 30, 2014 (JP) .................................. 2014-134138

(51) Int. Cl.
*H04W 76/00* (2018.01)
*H04W 84/20* (2009.01)
(Continued)

(52) U.S. Cl.
CPC ............. *H04W 76/00* (2013.01); *H04L 29/06* (2013.01); *H04L 63/061* (2013.01); *H04W 4/18* (2013.01);
(Continued)

(58) Field of Classification Search
CPC combination set(s) only.
See application file for complete search history.

(56) References Cited

U.S. PATENT DOCUMENTS

| 6,901,275 | B1 | 5/2005 | Aoyagi | |
| 7,356,360 | B2* | 4/2008 | Katayama | H04W 52/0219 455/574 |

(Continued)

FOREIGN PATENT DOCUMENTS

| CN | 101663852 A | 3/2010 |
| EP | 1324540 A2 | 7/2003 |

(Continued)

OTHER PUBLICATIONS

International Search Report (ISR) and Written Opinion dated Aug. 25, 2015 issued in International Application No. PCT/JP2015/066304.

(Continued)

*Primary Examiner* — Zhiyu Lu
(74) *Attorney, Agent, or Firm* — Holtz, Holtz & Volek PC

(57) ABSTRACT

A radio communication apparatus performing radio communication based on either role, a master or a slave, includes a role change receiver receiving a role change request from a slave to a master when the radio communication apparatus has a role of slave and has established connection to another radio communication apparatus operating as a master, and a receiver awaiting identification information transmitted by the other radio communication apparatus by receiving multiple channels including a given channel in a given pattern when the role change receiver receives the change request. The receiver receives the multiple channels in the given pattern such that the time or number of times of awaiting the identification information on the given channel is longer or (Continued)

higher than a given comparison criterion for when the role change receiver does not receive the change request.

9 Claims, 10 Drawing Sheets

(51) Int. Cl.
    *H04L 29/06*     (2006.01)
    *H04W 4/18*     (2009.01)
    *H04W 8/24*     (2009.01)
    *G06Q 30/02*     (2012.01)
    *H04J 3/06*     (2006.01)
    *H04W 12/08*     (2009.01)
    *H04W 12/00*     (2009.01)

(52) U.S. Cl.
    CPC ........... *H04W 8/245* (2013.01); *H04W 84/20* (2013.01); *H04J 3/0641* (2013.01); *H04L 63/101* (2013.01); *H04W 12/00407* (2019.01); *H04W 12/08* (2013.01)

(56) References Cited

U.S. PATENT DOCUMENTS

| | | | |
|---|---|---|---|
| 8,811,335 B2 | 8/2014 | Yavuz et al. | |
| 9,521,585 B2 | 12/2016 | Yavuz et al. | |
| 2003/0124979 A1 | 7/2003 | Tanada et al. | |
| 2005/0117552 A1 | 6/2005 | Mikkelsen | |
| 2005/0143046 A1* | 6/2005 | Suzuki | H04W 84/20 455/343.2 |
| 2005/0287989 A1* | 12/2005 | Lee | H04L 63/0823 455/411 |
| 2008/0267121 A1 | 10/2008 | Lee et al. | |
| 2009/0034474 A1 | 2/2009 | Yavuz et al. | |
| 2010/0075605 A1 | 3/2010 | Yoneda et al. | |
| 2010/0311438 A1* | 12/2010 | Edge | H04L 67/14 455/456.1 |
| 2013/0003630 A1 | 1/2013 | Xhafa et al. | |
| 2013/0003715 A1 | 1/2013 | Xhafa et al. | |
| 2014/0169599 A1 | 6/2014 | Solum et al. | |
| 2014/0321286 A1 | 10/2014 | Yavuz et al. | |
| 2014/0321440 A1 | 10/2014 | Yavuz et al. | |
| 2014/0371880 A1* | 12/2014 | Lee | G05B 15/02 700/20 |
| 2015/0079939 A1 | 3/2015 | Naka | |

FOREIGN PATENT DOCUMENTS

| | | |
|---|---|---|
| JP | 2002344455 A | 11/2002 |
| JP | 2006025130 A | 1/2006 |
| JP | 2010079423 A | 4/2010 |
| JP | 2013229805 A | 11/2013 |
| WO | 2013003753 A2 | 1/2013 |
| WO | 2013161248 A1 | 10/2013 |

OTHER PUBLICATIONS

Partial Supplementary European Search Report dated Feb. 26, 2018 issued in counterpart European Application No. 15815556.4.

Chinese Office Action (and English langusgae translation thereof) dated Apr. 1, 2019 issued in counterpart Chinese Application No. 201580036171.2.

Office Action (Final Rejection) dated Feb. 28, 2019 issued in U.S. Appl. No. 15/321,696.

* cited by examiner

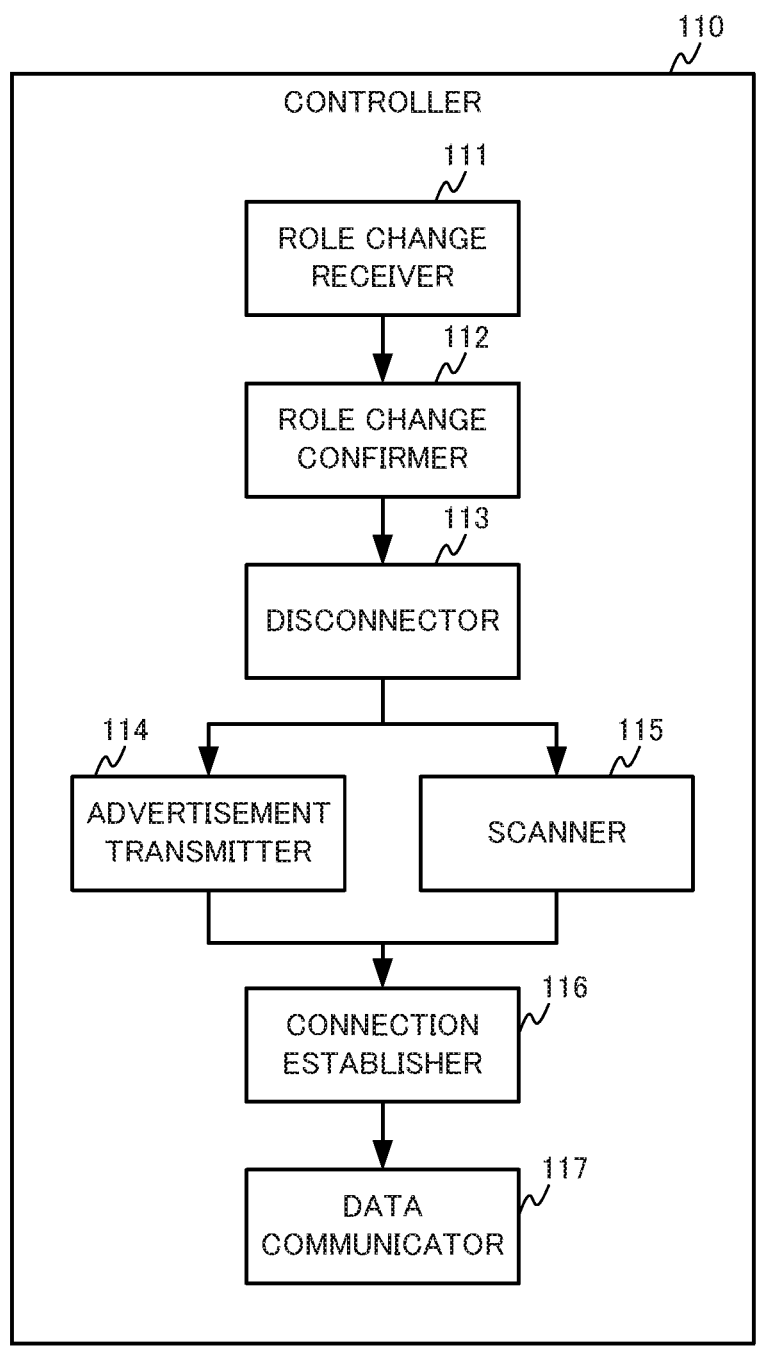

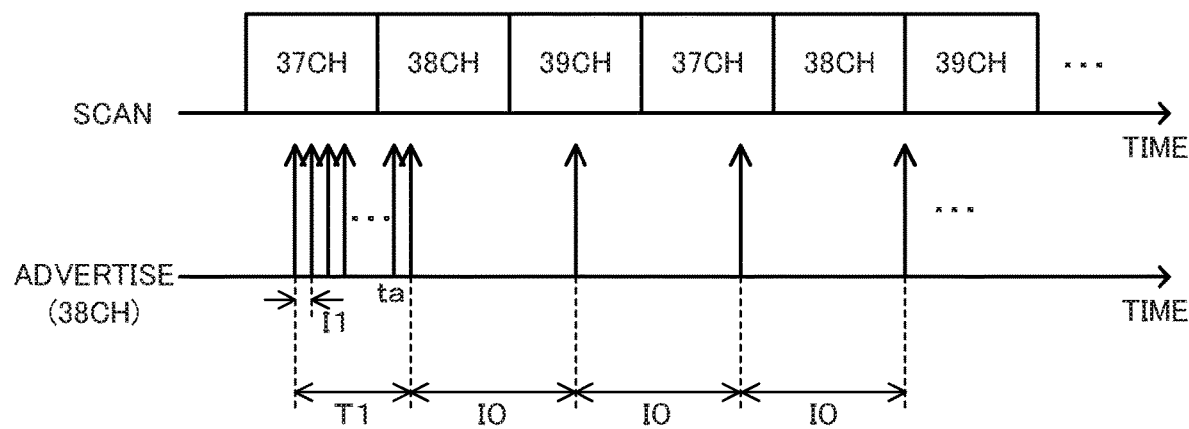
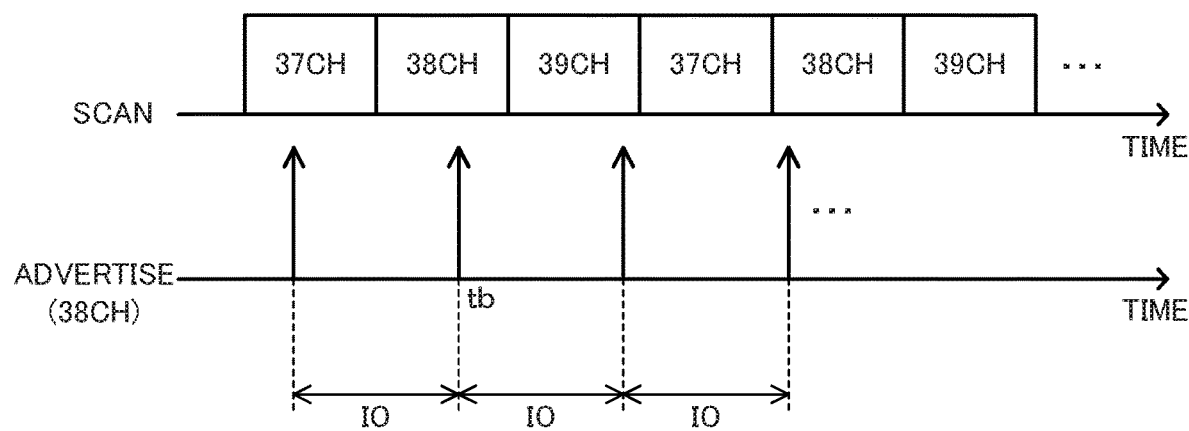

RADIO COMMUNICATION APPARATUS AND RADIO COMMUNICATION METHOD

CROSS-REFERENCE TO RELATED APPLICATIONS

This is a Divisional of U.S. application. Ser. No. 15/321,696, filed Dec. 22, 2016, which is a U.S. National Phase application of PCT/JP2015/066304, filed Jun. 5, 2015, which is based upon and claims the benefit of priority from prior Japanese Patent Application No. 2014-134138, filed Jun. 30, 2014, the entire contents of all of which are incorporated herein by reference.

TECHNICAL FIELD

The present disclosure relates to a radio communication apparatus and radio communication method.

BACKGROUND ART

There are techniques for multiple radio communication apparatuses wirelessly communicating with each other, with which each having a predetermined role set, the communication apparatuses perform radio communication based on their roles. For example, Unexamined Japanese Patent Application Kokai Publication No. 2013-229805 discloses a technique for wireless gigabit (WiGig) communication, with which a radio communication apparatus, for which one of two roles, "station (STA)" and "personal basic service set central point (PCP)," is set, determines whether it is necessary to change its own role in making an attempt to connect to another radio communication apparatus, and when the change is necessary, switches the role of the other radio communication apparatus and its own role and makes connection to the other radio communication apparatus.

CITATION LIST

Patent Literature

Patent Literature 1: Unexamined Japanese Patent Application Kokai Publication No. 2013-229805

SUMMARY OF INVENTION

Technical Problem

Moreover, in a radio communication system performing radio communication based on the Bluetooth (registered trademark) low energy, which is a short range radio communication standard, radio communication apparatuses operate based on one of two roles, a master taking the control of radio communication and a slave wirelessly communicating under the control of the master, while the connection is established. Moreover, a radio communication apparatus having many functions such as a smart-phone can operate both as a master and as a slave. Therefore, for example, a radio communication apparatus operating as a master may be desired during communication to change to a slave consuming less power for reducing the battery drain in some situations. However, for changing the role, the connection to the other communication apparatus should once be terminated. Once the connection is terminated, it is not guaranteed that connection is made to the same radio communication apparatus again. Therefore, smooth reconnection after role switching is demanded.

The present disclosure is made with the view of the above problem and an objective of the disclosure is to provide a radio communication apparatus and radio communication method allowing for smooth role switching.

Solution to Problem

In order to achieve the above objective, the radio communication apparatus according to a first exemplary aspect of the present disclosure is a radio communication apparatus performing radio communication based on either role, a master or a slave, comprising:

a role change receiver receiving a role change request from a master to a slave when the radio communication apparatus has a role of master and has established connection to another radio communication apparatus operating as a slave; and an identification information transmitter transmitting identification information to the other radio communication apparatus on a given channel at shorter time intervals when the role change receiver receives the change request than a given comparison criterion for when the role change receiver does not receive the change request.

In order to achieve the above objective, the radio communication apparatus according to a second exemplary aspect of the present disclosure is a radio communication apparatus performing radio communication based on either role, a master or a slave, comprising:

a role change receiver receiving a role change request from a slave to a master when the radio communication apparatus has a role of slave and has established connection to another radio communication apparatus operating as a master; and a receiver awaiting identification information transmitted by the other radio communication apparatus by receiving multiple channels including a given channel in a given pattern when the role change receiver receives the change request, wherein the receiver receives the multiple channels in the given pattern such that the time or number of times of awaiting the identification information on the given channel is longer or higher than a given comparison criterion for when the role change receiver does not receive the change request.

In order to achieve the above objective, the radio communication apparatus according to a third exemplary aspect of the present disclosure is a radio communication apparatus performing radio communication based on either role, a master or a slave, comprising:

a role change receiver receiving a role change request from a master to a slave when the radio communication apparatus has a role of master and has established connection to another radio communication apparatus operating as a slave;

a disconnector disconnecting from the other radio communication apparatus when the role change receiver receives the change request; and an identification information transmitter transmitting identification information to the other radio communication apparatus when it is determined that the disconnector disconnects from the other radio communication apparatus.

In order to achieve the above objective, the radio communication method according to a fourth exemplary aspect of the present disclosure is a radio communication method executed by a radio communication apparatus performing radio communication based on either role, a master or a slave, including:

a role change reception step of receiving a role change request from a master to a slave when the radio communication apparatus has a role of master and has established connection to another radio communication apparatus operating as a slave; and an identification information transmission step of transmitting identification information to the other radio communication apparatus on a given channel at shorter time intervals when the change request is received in the role change reception step than a given comparison criterion for when the change request is not received in the role change reception step.

In order to achieve the above objective, the radio communication method according to a fifth exemplary aspect of the present disclosure is a radio communication method executed by a radio communication apparatus performing radio communication based on either role, a master or a slave, including:

a role change reception step of receiving a role change request from a slave to a master when the radio communication apparatus has a role of slave and has established connection to another radio communication apparatus operating as a master; and a reception step of awaiting identification information transmitted by the other radio communication apparatus by receiving multiple channels including a given channel in a given pattern when the change request is received in the role change reception step, wherein in the reception step, the multiple channels are received in the given pattern such that the time or number of times of awaiting the identification information on the given channel is longer or higher than a given comparison criterion for when the change request is not received in the role change reception step.

Advantageous Effects of Invention

The present disclosure can provide a radio communication apparatus and radio communication method allowing for smooth role switching.

BRIEF DESCRIPTION OF DRAWINGS

FIG. 3 is a schematic block diagram showing an exemplary functional configuration of the controller of the radio communication apparatus according to Embodiment 1;

FIG. 4A is a chart showing chronological transitions of the scanning and advertising according to Embodiment 1;

FIG. 4B is a chart showing chronological transitions of the scanning and advertising in the prior art;

DESCRIPTION OF EMBODIMENTS

Embodiments of the present disclosure will be described hereafter with reference to the drawings.

Embodiment 1

Figure 1:
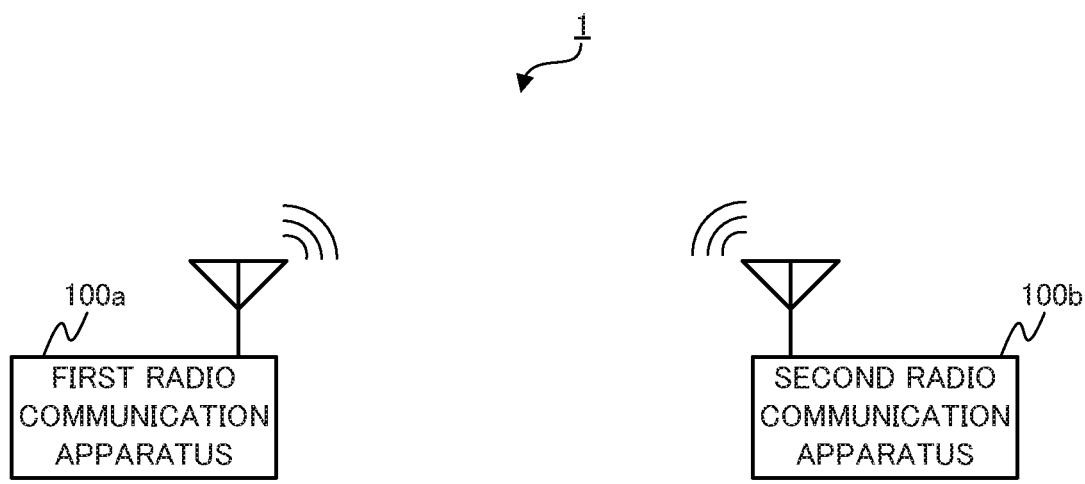
FIG. 1 is a diagram showing an exemplary configuration of the radio communication system according to Embodiment 1.

FIG. 1 is a diagram presenting an exemplary configuration of a radio communication system 1 according to Embodiment 1 of the present disclosure.

In the exemplary configuration shown in FIG. 1, the radio communication system 1 comprises two radio communication apparatuses 100 (100a and 100b). The radio communication apparatuses 100 wirelessly communicate with each other based on the Bluetooth (registered trademark) low energy (BLE, hereafter). The BLE is a standard (mode) designed with intent to pursue low power consumption in a short range radio communication standard called the Bluetooth (registered trademark). A radio communication apparatus 100 operates based on either role, a master or a slave, during radio communication with another radio communication apparatus 100. For example, a radio communication apparatus 100 operating as a master uses services (for example, measurement data) provided from a radio communication apparatus 100 operating as a slave. Moreover, for example, a radio communication apparatus 100 operating as a slave provides services (for example, measurement data) to a radio communication apparatus 100 operating as a master.

The radio communication apparatuses 100 are, for example, devices such as cell-phones, smart-phones, tablet-type personal computers, and note-type personal computers and terminals capable of radio communication based on the BLE as well. When functioning as a master, a radio communication apparatus 100 receives various data from a radio communication apparatus 100 functioning as a slave and displays various kinds of information on a display 107 described later and produces sound such as an alarm from a speaker 106 described later based on the received data. Moreover, when functioning as a slave, a radio communication apparatus 100 notifies a radio communication apparatus 100 functioning as a master of a summary of services its own apparatus retains and transmits an advertisement for awaiting a connection request from the master.

The hardware configuration of the radio communication system 1 according to Embodiment 1 will be described hereafter.

Figure 2:
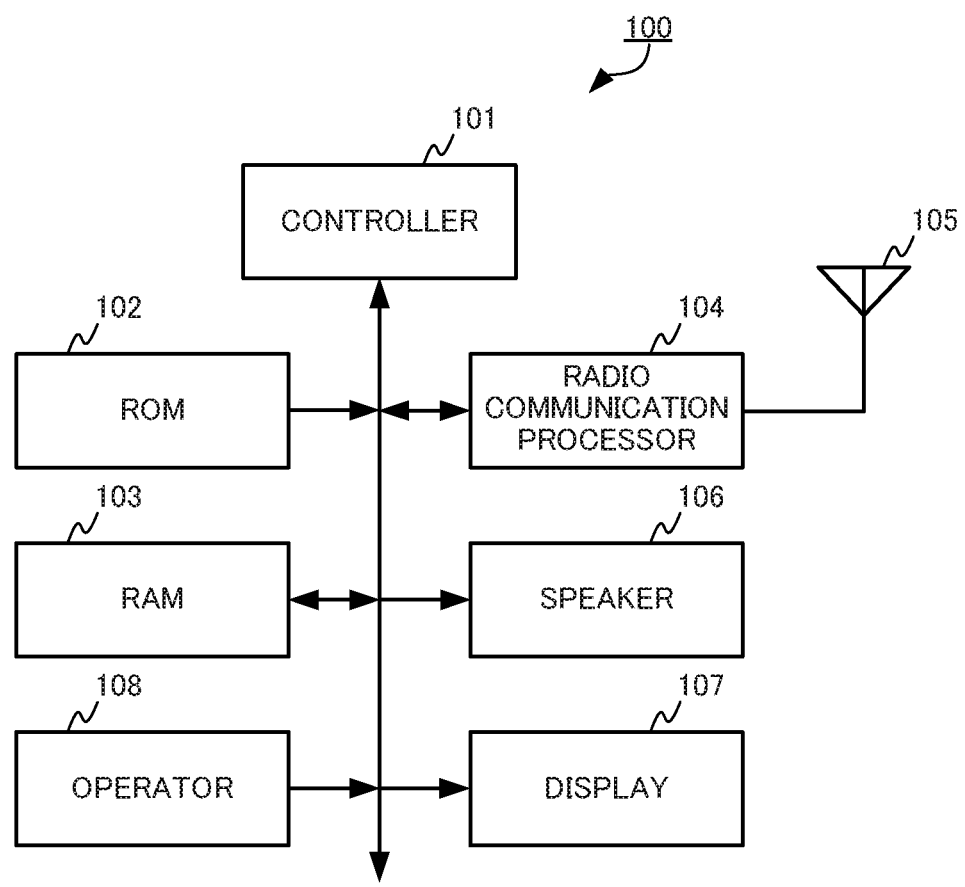
FIG. 2 is a schematic block diagram showing an exemplary configuration of the radio communication apparatus according to Embodiment 1.

FIG. 2 is a block diagram schematically showing an exemplary hardware configuration of the radio communication apparatuses 100 according to Embodiment 1. As shown in FIG. 2, a radio communication apparatus 100 comprises a controller 101, a read only memory (ROM) 102, a random access memory (RAM) 103, a radio communication processor 104, an antenna 105, a speaker 106, a display 107, and an operator 108.

The controller 101 comprises, for example, a central processing unit (CPU). The controller 101 executes software procedures according to programs stored in the ROM 102 (for example, programs for realizing the role switching procedures (a) and (b) shown in FIGS. 6 and 7 described later) to control various functions provided to the radio communication apparatus 100.

The ROM 102 comprises a nonvolatile memory such as a flash memory and stores programs and data for the controller 101 to control various functions as described above.

The RAM 103 comprises a volatile memory and is used as the work area for the controller 101 to temporarily store data for executing various procedures.

The radio communication processor 104 comprises, for example, a radio frequency (RF) circuit, base band (BB) circuit, memory circuit, and the like. The radio communication processor 104 transmits and receives radio signals based on the BLE via the antenna 105. Moreover, the memory circuit of the radio communication processor 104 is used as a region to store and update a white list (details are described later).

The speaker 106 outputs sound such as an alarm based on sound data from the controller 101. The display 107 comprises, for example, a liquid crystal display (LCD), electroluminescence (EL) display, a driver, and the like. The display 107 displays images according to image signals output from the controller 101.

The operator 108 is an interface used for receiving user operation contents and comprises, for example, an input apparatus such as a touch panel, buttons, and a keyboard. The operator 108 outputs received operation contents to the controller 101.

The functions of the controller 101 of the radio communication apparatuses 100 will be described hereafter. FIG. 3 is a schematic block diagram showing an exemplary functional configuration of the controller 101 of the radio communication apparatuses 100. As shown in FIG. 3, the controller 101 functions as a role change receiver 111, a role change confirmer 112, a disconnector 113, an advertisement transmitter 114, a scanner 115, a connection establisher 116, and a data communicator 117. The role change receiver 111, role change confirmer 112, disconnector 113, advertisement transmitter 114, scanner 115, connection establisher 116, and data communicator 117 may be a single CPU or may each be a CPU performing individual operation.

The role change receiver 111 receives a change request for changing the current role to the other role between two roles, a master and a slave, while connection to another radio communication apparatus 100 is established.

For example, the role change receiver 111 receives a change request based on convenience of its own communication apparatus 100. Specifically, the role change receiver 111 determines that a role change request from a master to a slave is received when, for example, its own radio communication apparatus 100 currently operates as a master and is very low in the remaining battery level. As a result of such a role change, the radio communication apparatus 100 can operate as a slave that consumes less power than a master.

Moreover, the role change receiver 111 may receive a change request from another radio communication apparatus 100. The role change receiver 111 determines that a change request is received when, for example, a change request for changing the current role to the other role is received from another radio communication apparatus 100 to which connection is established.

When the role change receiver 111 receives a change request based on convenience of its own radio communication apparatus 100, the role change confirmer 112 inquires of another radio communication apparatus 100 to which connection is established about the possibility of role change from the current role to the other role. Then, if the other radio communication apparatus 100 can change the role, the role change confirmer 112 transmits a request for switching the role (a role switching request).

Moreover, when the role change receiver 111 receives a change request from another radio communication apparatus 100 to which connection is established, the role change confirmer 112 responds to the other radio communication apparatus 100 as to whether its own radio communication apparatus 100 can change the role. Then, when a role switching request is received from the other radio communication apparatus 100, the role change confirmer 112 transmits a response to the role switching request to the other radio communication apparatus 100. Moreover, the role change confirmer 112 includes information regarding an advertising channel after disconnection (details will be described later) as a parameter in the response to the role switching request along with the possibility of role change.

Here, for example, it is possible to define a new bit presenting the possibility of role change among bits reserved for future use (RFU) prepared in the feature set of a link layer. Then, the radio communication apparatus 100 having received an inquiry about the possibility of role change has only to check the bit presenting the possibility of role change defined in the RFU and include information of the bit in the response to the inquiry.

Furthermore, the role change confirmer 112 registers a radio communication apparatus 100 to which connection is currently established as the communication partner on the white list set in the link layer. Here, reading the white list is not defined by the current host control interface (HCI) commands and therefore, has to be newly defined. Here, instead of defining a new command, information of addition of a device to the current white list may also be retained on the host side. In this way, the current while list is backed up on the host side and both radio communication apparatuses 100 switching their roles use the white list on which only the radio communication apparatus 100 of the role switching partner is set to advertise or scan, whereby it is possible to reconnect certainly to the role switching partner. Here, after the reconnection is completed or even when the reconnection is unsuccessful, information of the white list changed for the reconnection can be restored based on the information backed up on the host side.

The disconnector 113 terminates the connection when the role change confirmer 112 determines to switch the role with another radio communication apparatus 100 to which connection is established.

The advertisement transmitter 114 transmits an advertisement on one advertising channel set by the role change confirmer 112 when the role change confirmer 112 determines to switch the role from a master to a slave.

Here, advertising in radio communication based on the BLE is described. In the BLE-based radio communication, one radio communication apparatus 100 (advertiser) transmits an advertisement and another radio communication apparatus 100 (scanner) scans to receive the advertisement before connection is established. An advertisement or advertising means a packet or transmitting/receiving a packet including identification information for notifying another radio communication apparatus of its own presence in search for another radio communication apparatus or in an attempt to make connection to another radio communication apparatus.

In the BLE, a frequency band of 2400 MHz to 2483.5 MHz is divided into 40 channels of 2 MHz each in width. Among the 40 channels, three advertising channels having an intermediate frequency (RF center frequency) of 2402, 2426, or 2480 MHz (of which the advertising channel indices are 37, 38, and 39) are used for advertising. The other 37 data communication channels (of which the data channel indices are 0 to 36) are used for data communication after connection between a master and slave is established.

Here, in the prior art BLE-based radio communication, slaves advertise always using the above three channels. Conversely, in the radio communication system 1 according to Embodiment 1, when attempting to make reconnection to a radio communication apparatus 100 with which the role change from a slave to a master is determined, the advertisement transmitter 114 advertises using a given one advertising channel set in the response to the role switching request from the role change confirmer 112. Here, which channel is used as an advertising channel among the channels 37, 38, and 39 is, for example, preset by the user.

Furthermore, in the radio communication system 1 according to Embodiment 1, the advertisement transmitter 114 transmits an advertisement at intervals I1 (for example, 10 milliseconds) shorter than normal advertising intervals I0 (for example, 1 second) during a given time period T1 since the start of transmitting an advertisement as shown in FIG. 4A. Then, after the given time period T1 has elapsed, the advertisement transmitter 114 transmits an advertisement at the normal advertising intervals I0. Here, the normal advertising intervals are intervals at which the radio communication apparatus 100 transmits an advertisement when no role switching is conducted.

The scanner 115 scans for an advertisement on three advertising channels when the role change confirmer 122 determines to change the role from a slave to a master.

Parameters defining the scanning of the scanner 115 include a scan window and a scan interval. The scan window is a time during which scanning is actually performed. On the other hand, the scan interval indicates the intervals between adjoining scan windows. When the scan window and scan interval are equal, successive scanning is performed. The BLE specification recommends scanning only one channel in each scan window and changing a scanning channel every scan window, and states that all three channels should definitely be scanned. In Embodiment 1, the scanner 115 repeatedly scans the three advertising channels 37 to 39 in the order of 37, 38, 39, 37, 38, 39, . . . at an equal frequency as shown in FIG. 4A.

The time until an advertisement transmitted by the advertisement transmitter 114 of a radio communication apparatus 100 is received by the scanner 115 of another radio communication apparatus 100 will be described hereafter. FIG. 4A is a chart showing chronological transitions of the scanning and advertising according to Embodiment 1. On the other hand, FIG. 4B is a chart showing chronological transitions of the scanning and advertising in the prior art. Here, in both FIGS. 4A and 4B, it is assumed that an advertisement is transmitted on the channel 38. As shown in FIG. 4B, in the prior art advertising, an advertisement is transmitted at the normal advertising intervals I0 and the advertisement transmitted first since the start of scanning the channel 38 is scanned at a time tb. On the other hand, in FIG. 4A, an advertisement is transmitted first at the advertising intervals I1 shorter than the I0 and the advertisement transmitted first since the start of scanning the channel 38 is scanned at a time ta earlier than the time tb. In other words, an advertisement is transmitted more frequently for a given time period T1 since the start of advertising, whereby it is possible to quickly scan an advertisement while suppressing power consumption as much as possible. As described above, the scanner 115 functions as a receiver receiving an advertisement transmitted from another radio communication apparatus 100.

When the role change confirmer 112 determines to change the role from a master to a slave and a connection request is received from another radio communication apparatus 100 with respect to an advertisement transmitted by the advertisement transmitter 114, the connection establisher 116 establishes connection in response to the connection request if the other radio communication apparatus 100 is registered on the white list.

Moreover, when the role change confirmer 112 determines to change the role from a slave to a master and the scanner 115 receives an advertisement from another radio communication apparatus 100 registered on the white list, the connection establisher 116 transmits a connection request to the other radio communication apparatus 100 and establishes connection.

After the connection establisher 116 establishes connection to the other radio communication apparatus 100, the data communicator 117 performs data communication with the other radio communication apparatus 100 on the 37 data communication channels based on the role determined by the role change confirmer 112.

Figure 5:
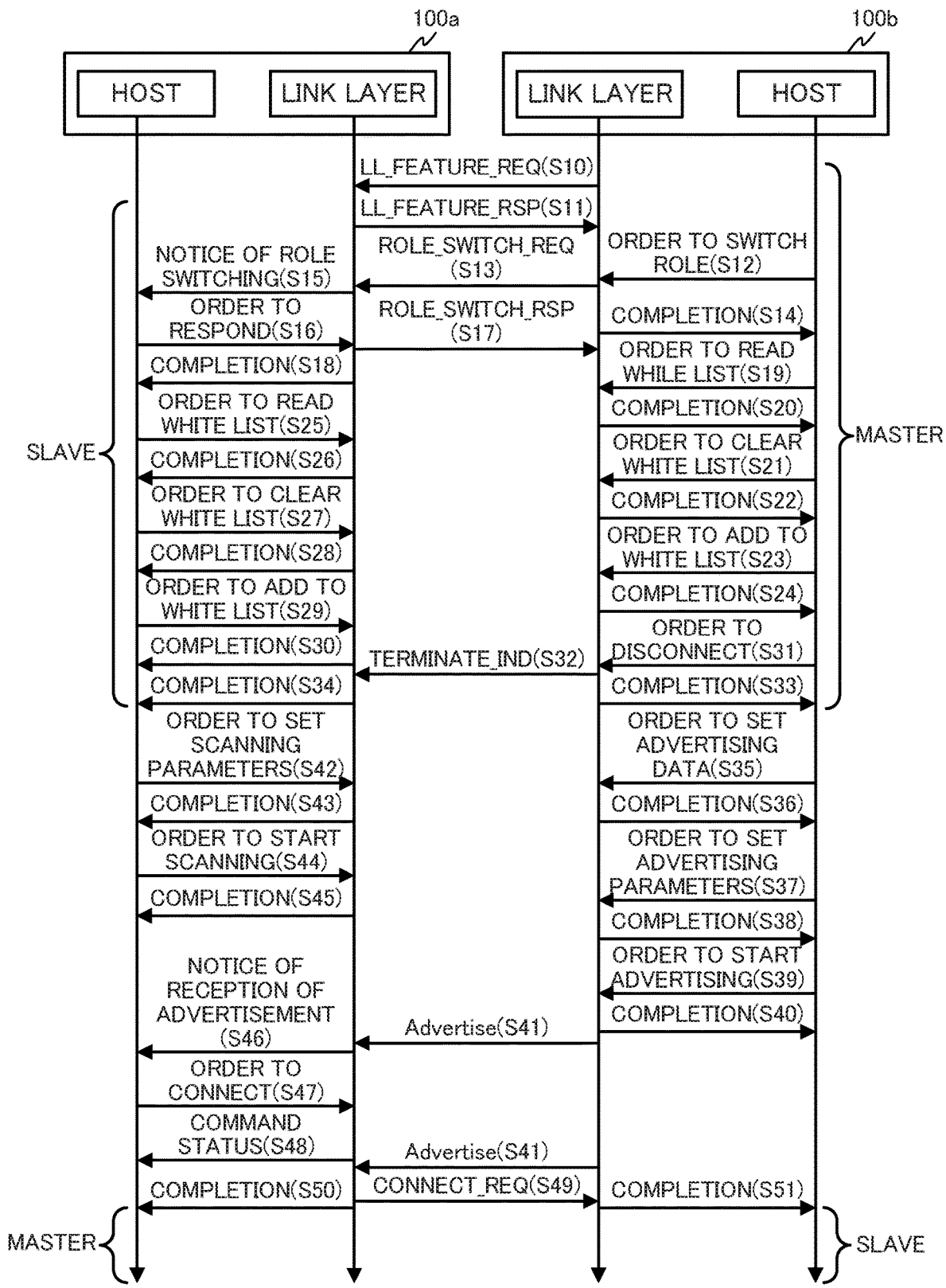
FIG. 5 is a sequence chart showing an exemplary operation of the radio communication system in Embodiment 1.

An exemplary operation of the radio communication system 1 according to Embodiment 1 will be described hereafter with reference to the sequence chart in FIG. 5. In the example shown in FIG. 5, operations of the host and link layer of the radio communication apparatuses 100a and 100b are described using a case in which the first radio communication apparatus 100a operating as a slave and the second radio communication apparatus 100b operating as a master switch their roles while their connection is established.

Triggered by a low battery level of its own apparatus, the second radio communication apparatus 100b transmits to the first radio communication apparatus 100a an inquiry about functions supported by the link layer of the first radio communication apparatus 100a (LL_FEATURE_REQ) in order to check whether the role switching with the first radio communication apparatus 100a is possible (Step S10).

Then, the first radio communication apparatus 100a having received the LL_FEATURE_REQ determines whether the role switching is supported with reference to FeatureSet presenting the link layer-supported functions. If the role switching is supported, the first radio communication apparatus 100a transmits a response indicating that the role switching is supported (LL_FEATURE_RSP) to the second radio communication apparatus 100b (Step S11).

Then, as the second radio communication apparatus 100b receives the response indicating that the role switching is supported from the first radio communication apparatus 100a, the host of the second radio communication apparatus 100b outputs a role switching order to the link layer (Step S12). Then, the link layer of the second radio communication apparatus 100b transmits a role switching request (ROLE_SWITCH_REQ) to the first radio communication apparatus 100a (Step S13) and notifies the host of the completion (Step S14).

Receiving the role switching request, the link layer of the first radio communication apparatus 100a notifies the host of reception of a role switching request (Step S15). Then, the host orders the link layer to respond to the second radio communication apparatus 100b that the role switching is possible when the first radio communication apparatus 100a has a sufficient remaining battery level and the role change to a master is possible (Step S16). Then, the link layer transmits a response indicating that the role switching is possible (ROLE_SWITCH_RSP) to the second radio communication apparatus 100b along with information presenting an advertising channel used for advertising upon reconnection (Step S17) and notifies the host of the completion (Step S18).

As the link layer of the second radio communication apparatus 100b receives the response indicating that the role switching is possible from the first radio communication apparatus 100a, the host of the second radio communication apparatus 100b orders the link layer to read the white list (Step S19). Then, the link layer reads data presenting the radio communication apparatuses 100 registered on the white list and notifies the host of the completion (Step S20).

Then, the host of the second radio communication apparatus 100b orders the link layer to clear the read data on the white list (Step S21). Then, the link layer clears the data and notifies the host of the completion (Step S22).

Then, the host of the second radio communication apparatus 100b orders the link layer to add data presenting the first radio communication apparatus 100a to the white list (Step S23). Then, the link layer adds data presenting the first radio communication apparatus 100a to the white list and notifies the host of the completion (Step S24).

Moreover, the first radio communication apparatus 100a performs the same processing as in the Steps S19 to S24 in Steps S25 to S30.

Then, the host of the second radio communication apparatus 100b orders the link layer to disconnect from the first radio communication apparatus 100a (Step S31). Then, the link layer transmits a disconnection request (TERMINATE_IND) to the first radio communication apparatus 100a (Step S32) and notifies the host of the completion (Step S33).

Moreover, receiving the disconnection request, the link layer of the first radio communication apparatus 100a notifies the host of the completion of disconnection from the second radio communication apparatus 100b (Step S34).

Then, the host of the second radio communication apparatus 100b orders the link layer to set advertising data (Step S35). After completing the setting of advertising data, the link layer notifies the host of the completion (Step S36).

Then, the host of the second radio communication apparatus 100b orders the link layer to set advertising parameters (Step S37). After completing the setting of advertising parameters, the link layer notifies the host of the completion (Step S38).

Then, the host of the second radio communication apparatus 100b orders the link layer to start advertising (Step S39). The link layer notifies the host of the completion (Step S40) and transmits an advertisement at advertising intervals shorter than the normal advertising intervals (Step S41).

Moreover, the host of the first radio communication apparatus 100a orders the link layer to set scanning parameters (Step S42). After completing the setting of scanning parameters, the link layer notifies the host of the completion (Step S43).

Then, the host of the first radio communication apparatus 100a orders the link layer to start scanning (Step S44). The link layer notifies the host of the completion (Step S45) and scans three advertising channels in sequence at given time intervals.

As it is determined that an advertisement is received from the second radio communication apparatus 100b registered on the white list, the link layer of the first radio communication apparatus 100a notifies the host of the reception of an advertisement (Step S46). The host orders the link layer to make connection to the second radio communication apparatus 100b (Step S47) and the link layer returns a command status to the host (Step S48).

Then, receiving an advertisement from the second radio communication apparatus 100b, the link layer of the first radio communication apparatus 100a transmits a connection request (CONNECT_REQ) to the second radio communication apparatus 100b (Step S49) and completes establishment of connection to the second radio communication apparatus 100b (Step S50). From then on, the first radio communication apparatus 100a performs data communication as a master with the second radio communication apparatus 100b.

Moreover, receiving the connection request from the first radio communication apparatus 100a, the link layer of the second radio communication apparatus 100b completes establishment of connection to the first radio communication apparatus 100a (Step S51). From then on, the second radio communication apparatus 100b performs data communication as a slave with the first radio communication apparatus 100a.

Figure 6:
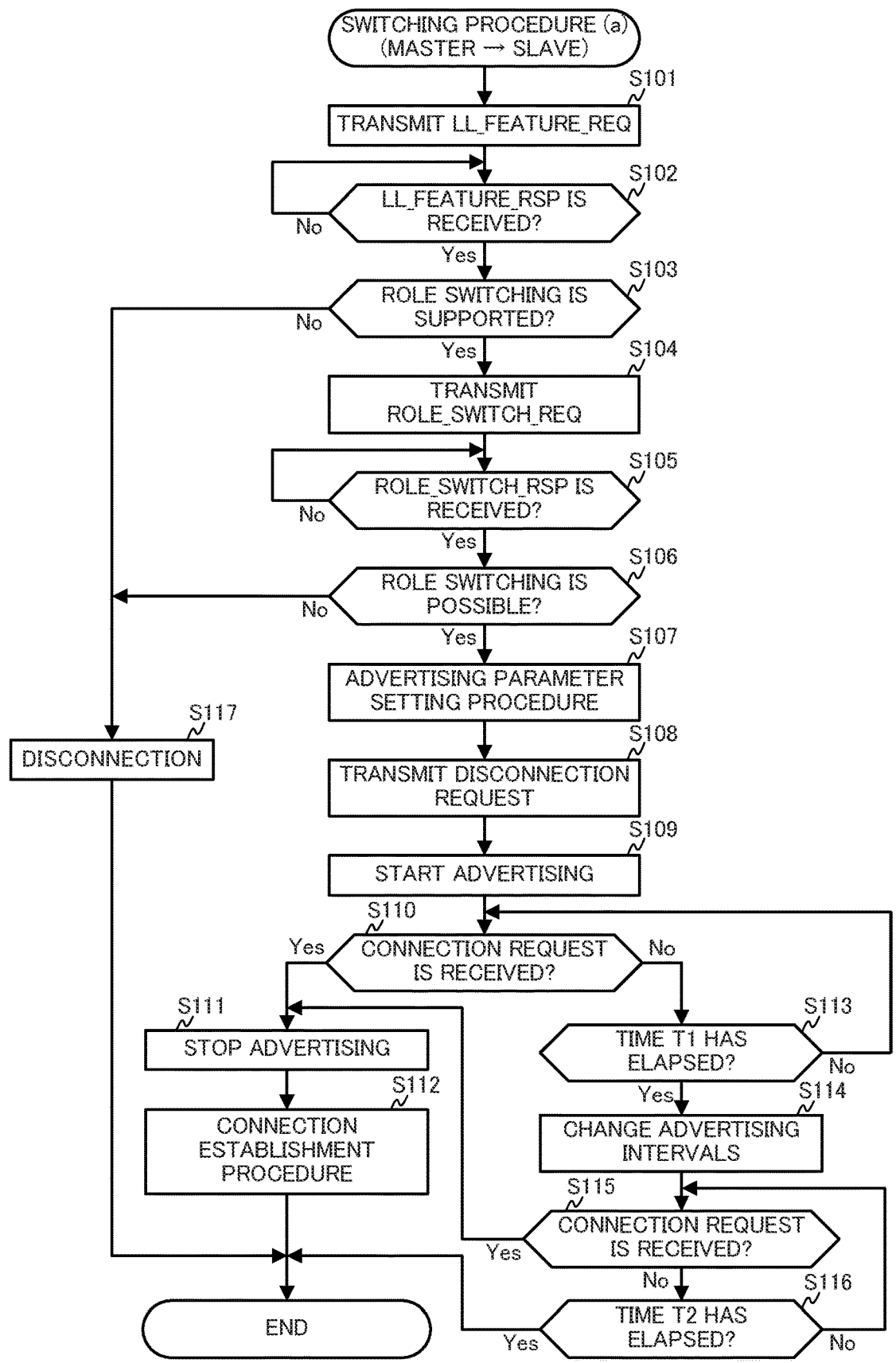
FIG. 6 is a flowchart showing an example of the role switching procedure (a) executed by the radio communication apparatus according to Embodiment 1.

Operation of the radio communication apparatus 100 according to Embodiment 1 will be described hereafter with reference to FIGS. 6 and 7. FIG. 6 is a flowchart showing an example of the role switching procedure (a) executed by the controller 101 of a radio communication apparatus 100 according to Embodiment 1. In this role switching procedure (a), a case is described in which a second radio communication apparatus 100b operating as a master changes its role to a slave while connection to a first radio communication apparatus 100a operating as a slave is established. The role switching procedure (a) is executed by the controller 101 of the second radio communication apparatus 100b.

The role switching procedure (a) shown in FIG. 6 starts when, for example, it is determined that the role change receiver 111 receives a role change request as the remaining battery level of its own apparatus becomes equal to or lower than a given value.

First, the role change confirmer 112 transmits to the first radio communication apparatus 100a an inquiry about functions supported by the link layer of the first radio communication apparatus 100a (LL_FEATURE_REQ) (Step S101). Then, the role change confirmer 112 determines whether a response to the inquiry (LL_FEATURE_RSP) is received from the first radio communication apparatus 100a (Step S102). The role change confirmer 112 awaits until a response is received (Step S102; No).

If a response to the inquiry (LL_FEATURE_RSP) is received from the first radio communication apparatus 100a (Step S102; Yes), the role change confirmer 112 determines whether the first radio communication apparatus 100a supports the role switching based on the received response (Step S103).

If the first radio communication apparatus 100a supports the role switching (Step S103; Yes), the role change confirmer 112 transmits a role switching request (ROLE_SWITCH_REQ) to the first radio communication apparatus 100a (Step S104). Then, the role change confirmer 112 determines whether a response to the role switching request (ROLE_SWITCH_RES) is received from the first radio communication apparatus 100a (Step S105). The role change confirmer 112 awaits until a response is received (Step S105; No).

If a response to the role switching request (ROLE_SWITCH_RES) is received from the first radio communication apparatus 100a (Step S105; Yes), the role change confirmer 112 determines whether the first radio communication apparatus 100a can switch the role based on the received response (Step S106).

If the first radio communication apparatus 100a can switch the role (Step S106; Yes), the role change confirmer 112 executes an advertising parameter setting procedure to set advertising parameters (Step S107). Among the advertising parameters to set here, the advertising intervals that are intervals between advertising operations are set to a value shorter than the normal advertising intervals. Moreover, the response to the role switching request (ROLE_SWICTH_RSP) includes data presenting an advertising channel. Moreover, the role change confirmer 112 registers the address of the first radio communication apparatus 100a on the white list.

Then, the disconnector 113 transmits a disconnection request (TERMINATE_IND) to the first radio communication apparatus 100a (Step S108). Then, the disconnector 113 disconnects from the first radio communication apparatus 100a.

Then, the advertisement transmitter 114 starts advertising using the parameters set in the Step S107 and the advertising channel notified in the response to the role switching request (ROLE_SWICTH_RSP).

The connection establisher 116 determines whether a connection request (CONNECT_REQ) is received from the first radio communication apparatus 100a registered on the white list (Step S110).

If the connection establisher 116 determines that a connection request is received from the first radio communication apparatus 100a (Step S110; Yes), the advertisement transmitter 114 stops advertising (Step S111).

The connection establisher 116 executes a procedure to establish connection to the first radio communication apparatus 100a using connection parameters included in the received connection request (Step S112). Then, the connection establisher 116 ends the role switching procedure (a). After this procedure ends, the second radio communication apparatus 100b operates as a slave and performs data communication with the first radio communication apparatus 100a operating as a master.

On the other hand, if the connection establisher 116 determines that no connection request is received from the first radio communication apparatus 100a (Step S110; No), the advertisement transmitter 114 determines whether a given time period T1 has elapsed since the start of advertising (Step S113). If the given time period T1 has not elapsed (Step S113; No), the advertisement transmitter 114 returns the processing to the Step S110.

If the given time period T1 has elapsed (Step S113; Yes), the advertisement transmitter 114 changes the advertising intervals to the normal value and continues to advertise (Step S114).

Then, the connection establisher 116 determines whether a connection request (CONNECT_REQ) is received from the first radio communication apparatus 100a registered on the white list (Step S115).

If a connection request is received from the first radio communication apparatus 100a (Step S115; Yes), the connection establisher 116 advances the processing to Step S111. On the other hand, if no connection request is received from the first radio communication apparatus 100a (Step S115; No), the advertisement transmitter 114 determines whether a given time period T2 (T2>T1) has elapsed since the start of advertising (Step S116). If the given time period T2 has not elapsed (Step S116; No), the advertisement transmitter 114 returns the processing to the Step S115.

If the given time period T2 has elapsed (Step S116; Yes), the connection establisher 116 determines that reconnection to the first radio communication apparatus 100a is unsuccessful and ends the role switching procedure (a).

On the other hand, if the role change confirmer 112 determines that the first radio communication apparatus 100a does not support the role switching (Step S103; No), or determines that the first radio communication apparatus 100a cannot switch the role (Step S106; No), the disconnector 113 disconnects from the first radio communication apparatus 100a (Step S117) and ends the role switching procedure (a).

The role switching procedure (b) executed by the controller 101 of a radio communication apparatus 100 according to Embodiment 1 and shown in FIG. 7 by way of example will be described hereafter. In this role switching procedure (b), a case is described in which a first radio communication apparatus 100a operating as a slave changes its role to a master while connection to a second radio communication apparatus 100b operating as a master is established. The role switching procedure (b) is executed by the controller 101 of the first radio communication apparatus 100a.

Figure 7:
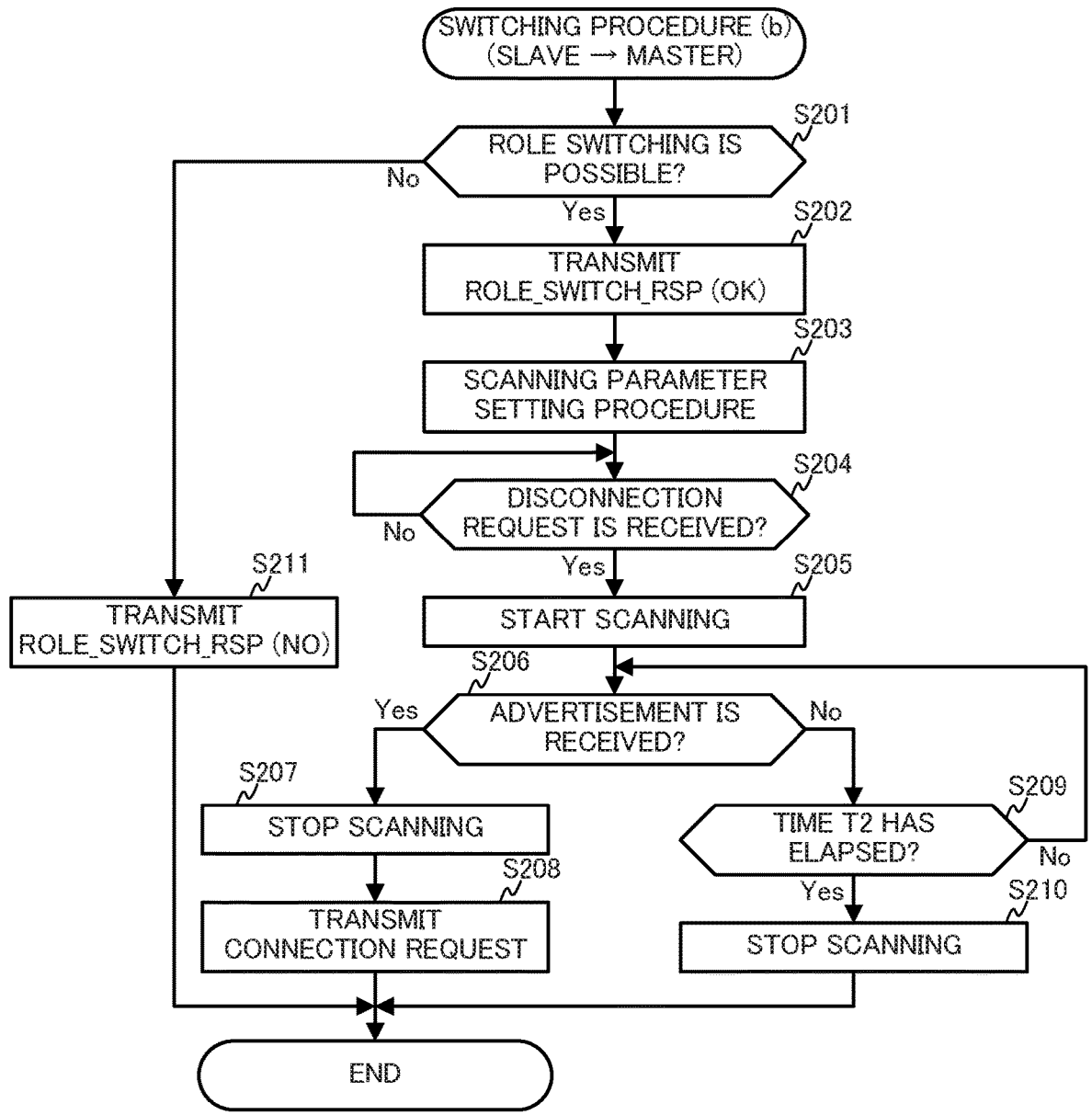
FIG. 7 is a flowchart showing an example of the role switching procedure (b) executed by the radio communication apparatus according to Embodiment 1.

The role switching procedure (b) shown in FIG. 7 starts when, for example, the role change receiver 111 receives a role switching request (ROLE_SWITVH_REQ) from the second radio communication apparatus 100b.

First, the role change confirmer 112 determines whether its own apparatus can switch the role (Step S201). The role change confirmer 112 determines that its own apparatus can switch the role when, for example, the remaining battery level of its own apparatus is equal to or higher than a given value.

Then, if its own apparatus can switch the role (Step S201; Yes), the role change confirmer 112 transmits a response indicating that the role switching is possible (ROLE_SWITCH_RSP (OK)) to the second radio communication apparatus 100b (Step S202). Moreover, the role change confirmer 112 includes data presenting an advertising channel in the response.

Then, the role change confirmer 112 executes a scanning parameter setting procedure to set scanning parameters (Step S203). Moreover, the role change confirmer 112 registers the address of the second radio communication apparatus 100b on the white list.

Then, the disconnector 113 determines whether a disconnection request (TERMINATE_IND) is received from the second radio communication apparatus 100b (Step S204). The disconnector 113 awaits until a disconnection request is received (Step S204; No).

If a disconnection request is received from the second radio communication apparatus 100b (Step S204; Yes), the disconnector 113 disconnects from the second radio communication apparatus 100b. Then, the scanner 115 starts scanning using the parameters set in the Step S203 (Step S205).

The connection establisher 116 determines whether an advertisement is received from the second radio communication apparatus 100b registered on the white list (Step S206).

If the connection establisher 116 determines that an advertisement is received from the second radio communication apparatus 100b (Step S206; Yes), the scanner 115 stops scanning (Step S207).

Then, the connection establisher 116 transmits a connection request (CONNECT_REQ) to the second radio communication apparatus 100b and establishes connection to the second radio communication apparatus 100b (Step S208). Then, the role switching procedure (b) ends. After this procedure ends, the first radio communication apparatus 100a operates as a master and performs data communication with the second radio communication apparatus 100b operating as a slave.

On the other hand, if no advertisement is received from the second radio communication apparatus 100b (Step S206; No), the scanner 115 determines whether a given time period T2 has elapsed since the start of scanning (Step S209). If the given time period T2 has not elapsed (Step S209; No), the scanner 115 returns the processing to the Step S206.

If the given time period T2 has elapsed (Step S209; Yes), the scanner 115 stops scanning (Step S210). Then, the connection establisher 116 determines that reconnection to the second radio communication apparatus 100b is unsuccessful and ends the role switching procedure (b).

On the other hand, if the first radio communication apparatus 100a cannot switch the role (Step S201; No), the role change confirmer 112 transmits a response indicating that the role switching is impossible (ROLE_SWITCH_RSP (NO)) to the second radio communication apparatus 100b (Step S211). Then, the role change confirmer 112 ends the role switching procedure (b).

As described above, the radio communication apparatus 100 according to the above Embodiment 1 presets an advertising channel while connection is established and a radio communication apparatus 100 transmitting an advertisement for reconnection transmits the advertisement on that advertising channel. In doing so, the advertisement is transmitted at shorter intervals than normally, whereby the reconnection can be quick.

Moreover, the connected radio communication apparatuses 100 synchronously disconnect from each other and then perform the advertising or scanning, whereby the reconnection can be smooth.

Moreover, a radio communication apparatus 100 operating as a slave after role switching receives only a connection request from the radio communication apparatus 100 registered on the white list. Moreover, a radio communication apparatus 100 operating as a master after role switching receives only an advertisement from the radio communication apparatus 100 registered on the white list. Therefore, it is possible to prevent connection to a radio communication apparatus other than the role switching partner after the disconnection.

Embodiment 2

In the above Embodiment 1, a radio communication apparatus 100 operating as a slave after role switching transmits an advertisement at shorter intervals after the disconnection, whereby smooth reconnection is realized. However, the method of making smooth reconnection is not restricted thereto. In Embodiment 2, as a scanning method by a radio communication apparatus 100 operating as a master after role switching, a case is described in which the first scan since the start of scanning is performed on an advertising channel preset together with the other radio communication apparatuses 100 for a longer time than the normal scan window and then the scan is performed on the three advertising channels in sequence using the normal scan window.

Figure 8:
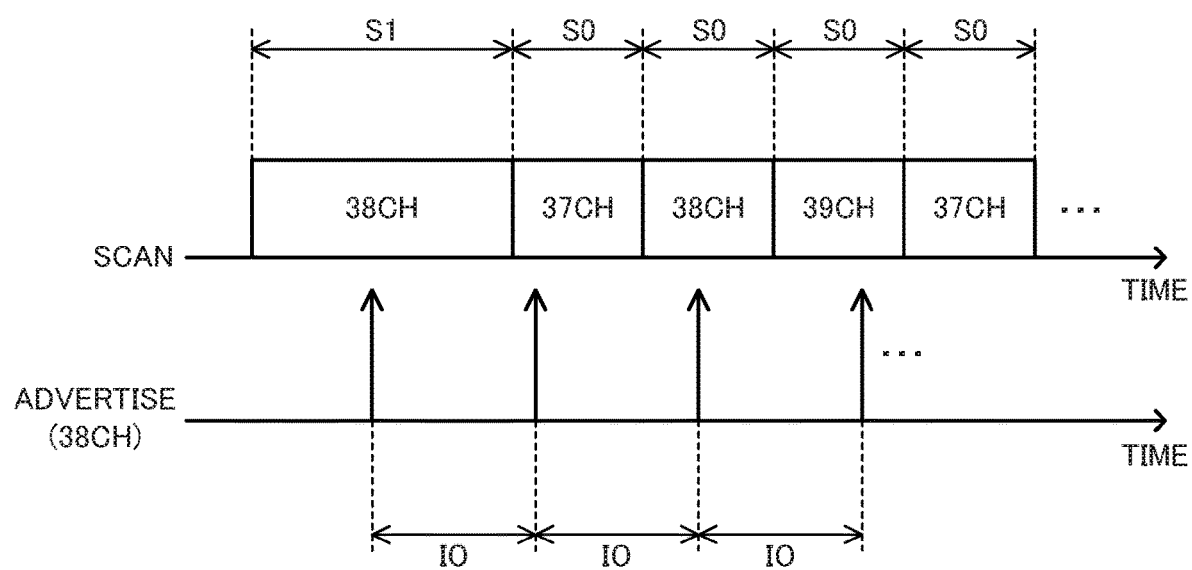
FIG. 8 is a chart showing chronological transitions of the scanning and advertising according to Embodiment 2.

FIG. 8 shows chronological transitions of the scanning and advertising according to Embodiment 2. In FIG. 8, it is assumed that an advertisement is transmitted on the channel 38 at the normal advertising intervals I0. As shown in FIG. 8, in the first scan since the start of scanning, the scanner 115 of the radio communication apparatus 100 scans on the channel 38 that is an advertising channel preset together with another radio communication apparatus 100 of the role switching partner. A scan window S1 at this point (for example, 10.24 seconds) is longer than a normal scan window S0 (for example, one second). Here, the normal scan window is a scan window for when no role switching is performed. After finishing scanning on the channel 38, the scanner 115 scans the three advertising channels in sequence using the normal scan window S0. As just stated, the first scan after the disconnection is a scan on a preset advertising channel for a longer time than the normal scan window, whereby quick scan for an advertisement is made possible.

Embodiment 3

As Embodiment 3, another scanning method by a radio communication apparatus 100 operating as a master after role switching will be described hereafter.

Figure 9:
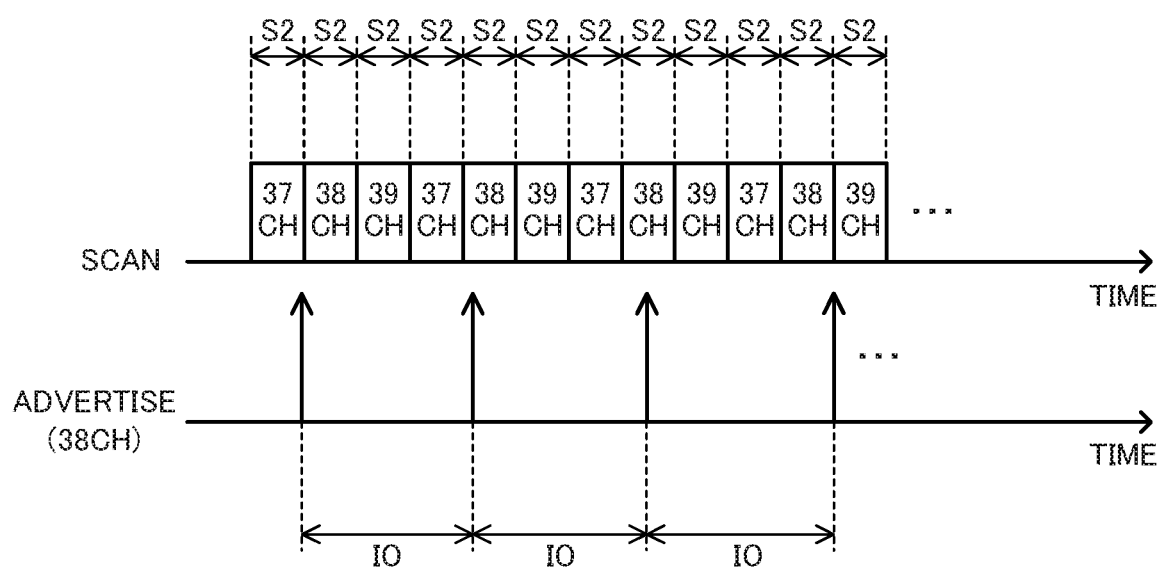
FIG. 9 is a chart showing chronological transitions of the scanning and advertising according to Embodiment 3.

FIG. 9 shows chronological transitions of the scanning and advertising according to Embodiment 3. In FIG. 9, it is assumed that an advertisement is transmitted on the channel 38 at the normal advertising intervals I0. As shown in FIG. 9, after starting to scan, the scanner 115 of the radio communication apparatus 100 scans the three advertising channels in sequence using a scan window S2 (for example, 25 milliseconds) shorter than the normal scan window S0. As just stated, using a shorter scan window, it is possible to quickly scan for an advertisement even if the channel on which an advertisement is sent from a radio communication apparatus 100 of the role switching partner is unknown.

Embodiment 4

As Embodiment 4, another scanning method by a radio communication apparatus 100 operating as a master after role switching will be described hereafter.

Figure 10:
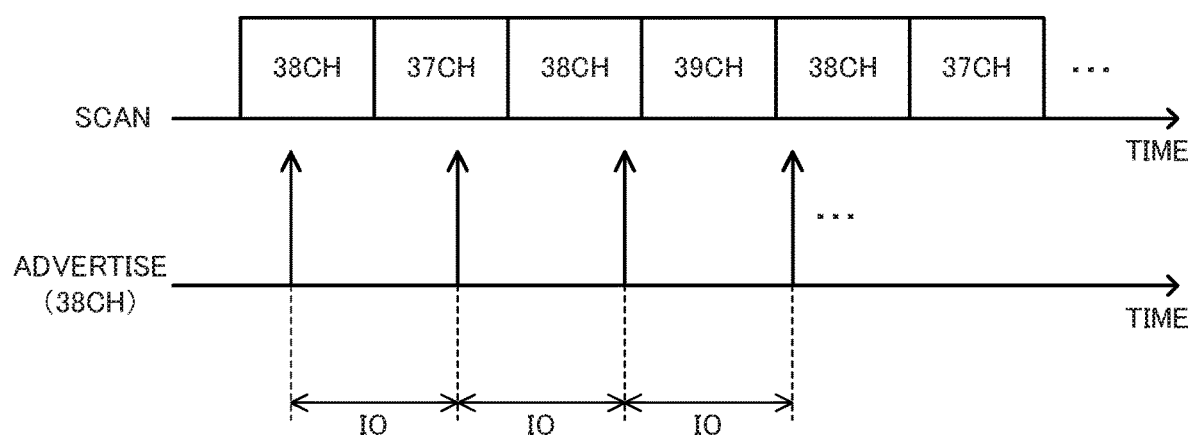
FIG. 10 is a chart showing chronological transitions of the scanning and advertising according to Embodiment 4.

FIG. 10 shows chronological transitions of the scanning and advertising according to Embodiment 4. In FIG. 10, it is assumed that an advertisement is transmitted on the channel 38 at the normal advertising intervals I0. As shown in FIG. 10, the scanner 115 of the radio communication apparatus 100 scans the three advertising channels in the manner that the advertising channel 38 preset together with another radio communication apparatus 100 of the role switching partner is scanned at a higher frequency instead of scanning the three advertising channels at an equal frequency. In other words, in the case shown in FIG. 10, the channel 38 is scanned in every other scan window. As just stated, the scanning order is set so that the advertising channel preset together with another radio communication apparatus 100 of the role switching partner is scanned at a higher frequency, whereby it is possible to quickly scan for an advertisement transmitted from a radio communication apparatus 100 of the role switching partner.

Embodiment 5

In conventional BLE-based radio communication, a radio communication apparatus makes connection using connection parameters included in a connection request (CONNECT_REQ) packet. However, for reconnection after role switching, the radio communication apparatus 100 may take over the connection parameters used in the connection before the role switching.

Specifically, connection parameters included in a connection request packet include AA, CRCInit, WinSize, WinOffset, Interval, Latency, Timeout, ChM, Hop, and SCA.

AA is the access address of a data packet after connection. The value of AA can be taken over provided that the value is not a duplicate of AA of any other connection. Moreover, the value can be taken over when a setting of inhibiting any other connection from disconnection to reconnection is enabled.

CRCInit is a value specifying the initial value of a shift register verifying the checksum of a packet. The value of CRCInit cannot be taken over upon reconnection because it is randomly created by the link layer.

WinSize presents a period during which the first data packet can be transmitted. The value of Win Size can be taken over.

WinOffset presents an offset time from transmission of a connection request to start of the next window size. The value of WinOffset can be taken over when the radio communication apparatus 100 is not busy with other operations after transmitting/receiving a connection request.

Interval presents the intervals of hopping channels. The value of Interval can be taken over.

Latency presents the number of times of a connection event being ignored by a radio communication apparatus 100 operating as a slave when there are no data to transmit to a radio communication apparatus 100 operating as a master. The value of Latency can be taken over.

Timeout is a time in which connection is determined to be lost. The value of Timeout can be taken over.

ChM is a value specifying which data channel is to use for a connection event. The value of ChM can be taken over.

Hop is a value specifying the order of switching data channels. The value of Hop can be taken over.

SCA is a value presenting the accuracy of the sleep clock of a radio communication apparatus 100 operating as a master. The value of SCA can be taken over when a radio communication apparatus 100 operating as a master and a radio communication apparatus 100 operating as a slave have the same clock accuracy.

Hence, it may be possible that among the connection parameters used in the connection before role switching, those that can be taken over are retained after disconnection, and the connection establisher 116 of a radio communication apparatus 100 operating as a master after the role switching transmits a connection request including connection parameters that cannot be taken over and excluding connection parameters that can be taken over in an attempt to reconnect to a radio communication apparatus 100 of the role switching partner. As just stated, with a simplified connection request excluding connection parameters that can be taken over being transmitted, it is possible for a radio communication apparatus 100 receiving the connection request to save power in the reception and in the packet processing.

Embodiments of the present disclosure are described above. The present disclosure is not confined to the above embodiments.

For example, in the above embodiments, information presenting an advertising channel in an attempt to make reconnection after disconnection is included in a response to a role switching request by way of example. However, the method of giving notice of an advertising channel upon reconnection is not restricted thereto. It is sufficient that an advertising channel upon reconnection is set by any method between the radio communication apparatuses 100 operating as a slave and a master before they are disconnected. For example, when a radio communication apparatus 100 operating as a master transmits a role switching request, information presenting an advertising channel upon reconnection may be included in the packet.

Moreover, in the above embodiments, a radio communication apparatus 100 operating as a master transmits a role switching request by way of example. However, a radio communication apparatus 100 operating as a slave may transmit a role switching request.

Moreover, in the above embodiments, the role switching partner is registered on the white list by way of example for assuring reconnection to the role switching partner. However, instead of using the white list, the advertisement transmitter 114 of a radio communication apparatus 100 operating as a slave after role switching may use, in advertising, a direct advertisement (ADV_DIRECT_IND) specifying a radio communication apparatus 100 of the role switching partner as the destination of an advertisement. The address of the partner has been obtained from information in the advertisement upon connection before role switching; therefore, directly advertising to that address can prevent connection to a radio communication apparatus other than the role switching partner.

Moreover, the method of transmitting an advertisement described in Embodiment 1 and the methods of scanning described in Embodiments 2 to 4 may be combined. For example, it may possible that the advertisement transmitter 114 of a radio communication apparatus 100 operating as a slave after role switching transmits an advertisement on the channel 38 at advertising intervals T1 until a given time period T1 elapses since the start of advertising and concurrently, the scanner 115 of a radio communication apparatus 100 operating as a master after role switching scans the channel 38 in a scan window S1 in the first scan.

Moreover, in the above embodiments, the radio communication system performing radio communication based on the BLE as an exemplary radio communication standard is described by way of example. The radio communication standard to which the present disclosure is applicable is not restricted to the BLE and the present disclosure is applicable to other standards of communication between devices operating as a master and a slave.

Moreover, the radio communication apparatus 100 according to the present disclosure can be realized by a conventional computer system, not by a dedicated apparatus. For example, a computer may execute programs to realize the functions of the radio communication apparatus 100. The programs for realizing the functions of the radio communication apparatus 100 may be stored on a non-transitory computer-readable recording medium such as a universal serial bus (USB) memory, secure digital (SD) memory card, compact disc read only memory (CD-ROM), digital versatile disc (DVD), Blu-ray (registered trademark) disc (BD), and hard disk drive (HDD), or downloaded on a computer via a network.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

The present application claims the priority based on Japanese Patent Application No. 2014-134138, filed on Jun. 30, 2014, and the contents of the basic application are all incorporated herein.

The invention claimed is:

1. A radio communication apparatus performing radio communication based on either role, a master or a slave, the radio communication apparatus comprising:
   a role change receiver receiving a role change request to change from a slave to a master when the radio communication apparatus has a role of slave and has established connection to another radio communication apparatus operating as a master; and
   a receiver awaiting identification information transmitted by the other radio communication apparatus by receiving multiple channels including a given channel in a given pattern,
   wherein, in response to the role change receiver receiving the role change request, in order to establish reconnection to the other radio communication apparatus, the given pattern in which the receiver receives the multiple channels is one of (i) a pattern in which time intervals at which the receiver awaits the identification information on the given channel are longer than time intervals at which the receiver awaits the identification information when the role change receiver does not receive the role change request and (ii) a pattern in which a number of times that the identification information is received per unit time is higher than a number of times that the identification information is received per unit time when the role change receiver does not receive the role change request.

2. The radio communication apparatus according to claim 1, wherein the receiver receives the given channel until a first given time elapses since a start of reception and then receives the multiple channels in sequence for a second given time shorter than the first given time.

3. The radio communication apparatus according to claim 1, wherein the receiver receives the multiple channels in sequence at time intervals that are shorter than the time intervals at which the receiver awaits the identification information after the role change receiver receives the role change request.

4. The radio communication apparatus according to claim 1, wherein the receiver alternately receives the given channel and the channels other than the given channel among the multiple channels.

5. The radio communication apparatus according to claim 1, further comprising:
   a role change confirmer inquiring of the other radio communication apparatus about the possibility of role change from a master to a slave when the role change receiver receives the role change request,
   wherein the receiver awaits the identification information transmitted by the other radio communication apparatus when a response from the other radio communication apparatus to the inquiry from the role change confirmer indicates that the role change is possible.

6. The radio communication apparatus according to claim 1, wherein the role change receiver receives the role change request from the other radio communication apparatus.

7. The radio communication apparatus according to claim 1, further comprising:
   a connection establisher transmitting a connection request to the other radio communication apparatus having transmitted the identification information received by the receiver and establishing connection to the other radio communication apparatus,
   wherein when receiving the role change request, the role change receiver records, in a storage apparatus, information of the other radio communication apparatus, and
   wherein when the identification information is received from the other radio communication apparatus and apparatus information of the other radio communication apparatus having transmitted the connection request is recorded in the storage apparatus, the connection establisher transmits a connection request to the other radio communication apparatus having transmitted the identification information.

8. The radio communication apparatus according to claim 7, wherein the connection establisher takes over connection parameters used in connection before role change as connection parameters after role change.

9. A radio communication method executed by a radio communication apparatus performing radio communication based on either role, a master or a slave, the method comprising:
   receiving a role change request to change from a slave to a master when the radio communication apparatus has a role of slave and has established connection to another radio communication apparatus operating as a master; and
   awaiting identification information transmitted by the other radio communication apparatus by receiving multiple channels including a given channel in a given pattern,
   wherein, in response to the role change request being received, in order to establish reconnection to the other radio communication apparatus, the given pattern in which the multiple channels are received is one of (i) a pattern in which time intervals at which the identification information is awaited on the given channel are longer than time intervals at which the identification information is awaited when the role change request is not received and (ii) a pattern in which a number of times that the identification information is received per unit time is higher than a number of times that the identification information is received per unit time when the role change request is not received.

* * * * *